United States Patent
Garner et al.

(10) Patent No.: US 8,140,551 B2
(45) Date of Patent: Mar. 20, 2012

(54) ADDRESS MATCHING

(75) Inventors: Michael C. Garner, Collierville, TN (US); Harry W. Aldstadt, Woodbridge, VA (US)

(73) Assignee: The United States Postal Service, Washington, DC (US)

( * ) Notice: Subject to any disclaimer, the term of this patent is extended or adjusted under 35 U.S.C. 154(b) by 385 days.

(21) Appl. No.: 12/222,903

(22) Filed: Aug. 19, 2008

(65) Prior Publication Data

US 2008/0319970 A1    Dec. 25, 2008

Related U.S. Application Data

(63) Continuation of application No. 11/362,057, filed on Feb. 27, 2006, now abandoned.

(51) Int. Cl.
*G06F 7/00* (2006.01)
(52) U.S. Cl. ...................................................... 707/758
(58) Field of Classification Search .................. 707/758
See application file for complete search history.

(56) References Cited

U.S. PATENT DOCUMENTS

| | | |
|---|---|---|
| 5,422,821 A | 6/1995 | Allen et al. |
| 5,452,203 A | 9/1995 | Moore |
| 5,870,733 A | 2/1999 | Bass et al. |
| 6,101,496 A | 8/2000 | Esposito |
| 6,272,495 B1 | 8/2001 | Hetherington |
| 6,327,373 B1 | 12/2001 | Yura |
| 6,457,012 B1 * | 9/2002 | Jatkowski ..................... 707/756 |
| 6,578,046 B2 | 6/2003 | Chang et al. |
| 6,643,648 B1 | 11/2003 | Ross et al. |
| 6,711,555 B1 * | 3/2004 | Sanders ........................ 705/406 |
| 6,741,724 B1 | 5/2004 | Bruce et al. |
| 2002/0078024 A1 | 6/2002 | Bellamy et al. |
| 2002/0124015 A1 | 9/2002 | Cardno et al. |
| 2003/0069874 A1 | 4/2003 | Hertzog et al. |

* cited by examiner

*Primary Examiner* — John E Breene
*Assistant Examiner* — Joshua Bullock
(74) *Attorney, Agent, or Firm* — Finnegan, Henderson, Farabow, Garrett & Dunner LLP

(57) ABSTRACT

A method and system for providing address matching consistent with the invention includes comparing the address against a plurality of address records in a database, wherein the database comprises at least one or the following: a delivery point database (505) and an enhanced delivery point database (705). In addition, the method and system include providing output data indicating whether the address has been matched to at least one of the plurality of address records in the database.

17 Claims, 17 Drawing Sheets

| FIELD REFERENCE NUMBER | FIELD DESCRIPTION | LOGICAL LENGTH | RELATIVE POSITION FROM | RELATIVE POSITION THRU | CONTENTS NOTES |
|---|---|---|---|---|---|
| 1 COPYRIGHT DETAIL CODE | | 01 | 01 | 01 | "C" |
| 2 DELIVERY ZIP CODE | | 05 | 02 | 06 | |
| 3 DELIVERY CARRIER ROUTE ID | | 04 | 07 | 10 | |
| 4 DELIVERY SEQUENCE NUMBER | | 04 | 11 | 14 | |
| 5 ACTION CODE | | 01 | 15 | 15 | A=ADD<br>D=DELETE |
| 6 RECORD TYPE CODE | | 01 | 16 | 16 | F=FIRM<br>G=GENERAL<br>H=HIGHRISE<br>P=PO BOX<br>R=RURAL/HC<br>S=STREET |
| 7 DELIVERY ADDRESS NO | | 10 | 17 | 26 | 01 THRU 99 |
| 8 STREET PRE DRCTN ABREV | | 02 | 27 | 28 | |
| 9 STREET NAME | | 28 | 29 | 56 | USPS |
| 10 STREET SUFFIX ABREV | | 04 | 57 | 60 | |
| 11 STREET POST DRCTN ABREV | | 02 | 61 | 62 | 001 THRU 999 |
| 12 SECONDARY ADDRESS ABREV | | 04 | 63 | 66 | |
| 13 APT ROOM NUMBER | | 08 | 67 | 74 | |
| 14 BUILDING OR FIRM NAME | | 40 | 75 | 114 | |
| 15 DELIVERY TYPE CODE | | 01 | 115 | 115 | |
| 16 ADDR VACANT IND | | 01 | 116 | 116 | |

TO *FIG. 6 CONT.*

FROM *FIG.6*

| | | | | |
|---|---|---|---|---|
| 17 DELIVERY POINT DROP IND | 01 | 117 | 117 | |
| 18 DELIVERY POINT BUSINESS/ FAMILY SERVED COUNT | 03 | 118 | 120 | |
| 19 SEASONAL DELIVERY IND | 01 | 121 | 121 | |
| 20 ZIP ADD ON LOW NO<br>ZIP SECTOR NO<br>ZIP SEGMENT NO | 02<br>02 | 122<br>124 | 123<br>125 | |
| 21 ZIP ADD ON HIGH NO<br>ZIP SECTOR NO<br>ZIP SEGMENT NO | 02<br>02 | 126<br>128 | 127<br>129 | |
| 22 BASE ALT CODE | 01 | 130 | 130 | B=BASE A=ALTERNATE |
| 23 LACS STATUS IND | 01 | 131 | 131 | L=LACS CONVERTED BLANK=N/A |
| 24 ADDR SORT INSTRUCTION | 01 | 132 | 132 | |
| 25 FINANCE NUMBER | 06 | 133 | 132 | |
| 26 STATE ABREV | 02 | 139 | 138 | |
| 27 CONGRESSIONAL DISTRICT ID | 01 | 141 | 142 | |
| 28 MUNICIPALITY CITY STATE KEY | 06 | 143 | 148 | |
| 29 URBANIZATION CITY STATE KEY | 06 | 149 | 154 | |
| 30 PREFD LAST LINE CITY STATE KEY | 06 | 155 | 160 | |
| 31 SCHEME ZIP CODE | 05 | 161 | 165 | |
| 32 SCHEME CARRIER ROUTE ID | 04 | 166 | 169 | |

| FIELD REFERENCE NUMBER | FIELD DESCRIPTION | LOGICAL LENGTH | RELATIVE POSITION FROM | RELATIVE POSITION THRU | CONTENTS NOTES |
|---|---|---|---|---|---|
| 1 COPYRIGHT DETAIL CODE | | 01 | 01 | 01 | "C" |
| 2 DELIVERY ZIP CODE | | 05 | 02 | 06 | |
| 3 DELIVERY CARRIER ROUTE ID | | 04 | 07 | 10 | |
| 4 DELIVERY SEQUENCE NUMBER | | 04 | 11 | 14 | |
| 5 ACTION CODE | | 01 | 15 | 15 | A=ADD D=DELETE |
| 6 RECORD TYPE CODE | | 01 | 16 | 16 | F=FIRM G=GENERAL H=HIGHRISE P=PO BOX R=RURAL/HC S=STREET |
| 7 DELIVERY ADDRESS NO | | 10 | 17 | 26 | 01 THRU 99 |
| 8 STREET PRE DRCTN ABREV | | 02 | 27 | 28 | |
| 9 STREET NAME | | 28 | 29 | 56 | USPS |
| 10 STREET SUFFIX ABREV | | 04 | 57 | 60 | |
| 11 STREET POST DRCTN ABREV | | 02 | 61 | 62 | 001 THRU 999 |
| 12 SECONDARY ADDRESS ABREV | | 04 | 63 | 66 | |
| 13 APT ROOM NUMBER | | 08 | 67 | 74 | |
| 14 BUILDING OR FIRM NAME | | 40 | 75 | 114 | |
| 15 DELIVERY TYPE CODE | | 01 | 115 | 115 | |
| 16 ADDR VACANT IND | | 01 | 116 | 116 | |

TO *FIG. 8 CONT*

FROM *FIG.8*

| | | | | |
|---|---|---|---|---|
| 17 DELIVERY POINT DROP IND | 01 | 117 | 117 | |
| 18 DELIVERY POINT BUSINESS/ FAMILY SERVED COUNT | 03 | 118 | 120 | |
| 19 SEASONAL DELIVERY IND | 01 | 121 | 121 | |
| 20 ZIP ADD ON LOW NO<br>    ZIP SECTOR NO<br>    ZIP SEGMENT NO | 02<br>02 | 122<br>124 | 123<br>125 | |
| 21 ZIP ADD ON HIGH NO<br>    ZIP SECTOR NO<br>    ZIP SEGMENT NO | 02<br>02 | 126<br>128 | 127<br>129 | |
| 22 BASE ALT CODE | 01 | 130 | 130 | B=BASE<br>A=ALTERNATE |
| 23 LACS STATUS IND | 01 | 131 | 131 | L=LACS CONVERTED<br>BLANK=N/A |
| 24 ADDR SORT INSTRUCTION | 01 | 132 | 132 | |
| 25 FINANCE NUMBER | 06 | 133 | 132 | |
| 26 STATE ABREV | 02 | 139 | 138 | |
| 27 CONGRESSIONAL DISTRICT ID | 01 | 141 | 142 | |
| 28 MUNICIPALITY CITY STATE KEY | 06 | 143 | 148 | |
| 29 URBANIZATION CITY STATE KEY | 06 | 149 | 154 | |
| 30 PREFD LAST LINE CITY STATE KEY | 06 | 155 | 160 | |
| 31 SCHEME ZIP CODE | 05 | 161 | 165 | |
| 32 SCHEME CARRIER ROUTE ID | 04 | 166 | 169 | |
| 33 DELIVERY POINT KEY | 26 | 170 | 195 | |

DELIVERY POINT KEY — 910

EXAMPLE:
1999-07-10-12.06.33.223318

LEGEND FOR DELIVERY POINT KEY — 1010

- 1999 - YEAR OF CREATION
- 07 - MONTH OF CREATION
- 10 - DAY OF CREATION
- 12 - HOUR OF CREATION
- .06 - MINUTE OF CREATION
- .33 - SECOND OF CREATION
- 223318 - SEQUENCE NUMBER OF CREATION

*FIG. 10*

BASE OR ALTERNATE

DELIVERY POINT FILE = BASE, IF: — 1205
ADDRESS: 123 MAIN STREET
ANYTOWN, USA 12345-6789

DELIVERY POINT FILE = ALTERNATE, IF:
IF ADDRESS IS KNOWN AS:
123 MAIN STREET
ANYTOWN, USA 12345-6789

AND, IF ADDRESS IS ALSO KNOWN AS: — 1210
123 GARNER STREET
ANYTOWN, USA 12345-6789

*FIG. 12*

ADDRESS MATCHING

RELATED APPLICATION

This is a continuation of and claims benefit of U.S. patent application Ser. No. 11/362,057, filed Feb. 27, 2006 now abandoned, which claims benefit of U.S. patent application Ser. No. 10/416,857, filed May 16, 2003, which is a national stage application under 35 U.S.C. §371 of PCT application No. PCT/US01/43090, filed Nov. 15, 2001, which claims the benefit of U.S. provisional application No. 60/249,255 filed Nov. 17, 2000, all of which are incorporated herein by reference.

TECHNICAL FIELD

The present invention relates to the field of providing address matching. More particularly, the present invention, in various specific embodiments, involves methods and systems directed to providing corrected addresses, completed addresses, and validity verification of addresses.

BACKGROUND

With the advent and steady growth of electronic mail and electronic commerce, traditional mail, that is, the physical mail stream, will increasingly be utilized for sending and receiving packages. In an effort to lower operating costs and increase value for their customer base, many high volume delivery users prepare packages and other items with automated equipment and presort and label the items prior to placement of the items into the item delivery system. Delivery system users realize a cost savings by correcting addresses, completing addresses, and verifying addresses, for example, prior to placing items into the delivery system.

Therefore, there is a need for delivery system operators, such as the United States Postal Service (USPS) and other organizations to efficiently provide address matching. More specifically, delivery system operators desire to efficiently provide corrected addresses, completed addresses, and validity verification of addresses. This is because in an increasingly competitive environment, it is essential for a delivery system operator to reduce costs and exceed the expectations of those who receive a service.

One solution to the address matching problem is for the delivery system operator or the delivery system user to utilize the ZIP plus 4 (ZIP+4) system. The ZIP+4 system is a product of the USPS that came out of the USPS Address Matching System (AMS) database. The ZIP+4 records, of which there are approximately 38 million, contain only address ranges, not specific addresses to a particular delivery point. For example, the database contains the address range, 100-198 Main Street associated with a unique ZIP+4 code.

Great inefficiencies are created in utilizing the ZIP+4 system because, for example, one address within a particular range may or may not exist. Thus with the ZIP+4 system, correct addresses of actual delivery points are not available. Accordingly, efficiently providing item attribute verification remains an elusive goal. Thus, there remains a need for efficiently providing address matching in an item delivery system. In addition, there remains a need for efficiently providing corrected addresses, completed addresses, and validity verification of addresses in the item delivery system.

SUMMARY OF THE INVENTION

In one aspect, a method for matching an address consistent with the invention includes comparing the address against a plurality of address records in a database, wherein the database comprises at least one of the following: a delivery point database and an enhanced delivery point database. In addition, the method includes providing output data indicating whether the address has been matched to at least one of the plurality of address records in the data base.

In another aspect, a system for matching an address consistent with the invention includes a component for comparing the address against a plurality of address records in a database, wherein the database comprises at least one of the following: a delivery point database and an enhanced delivery point database. The system further includes a component for providing output data indicating whether the address has been matched to at least one of the plurality of address records in the data base.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings:

FIG. 6 is a table illustrating an exemplary record of a delivery point database consistent with the present invention;

FIG. 8 is a table illustrating an exemplary record of an enhanced delivery point database consistent with the present invention;

FIG. 10 is a functional block diagram illustrating an exemplary delivery point key consistent with the present invention;

FIG. 12 is a functional block diagram illustrating the use of base record flag and alternate record flag consistent with the present invention.

DETAILED DESCRIPTION

Figure 1:
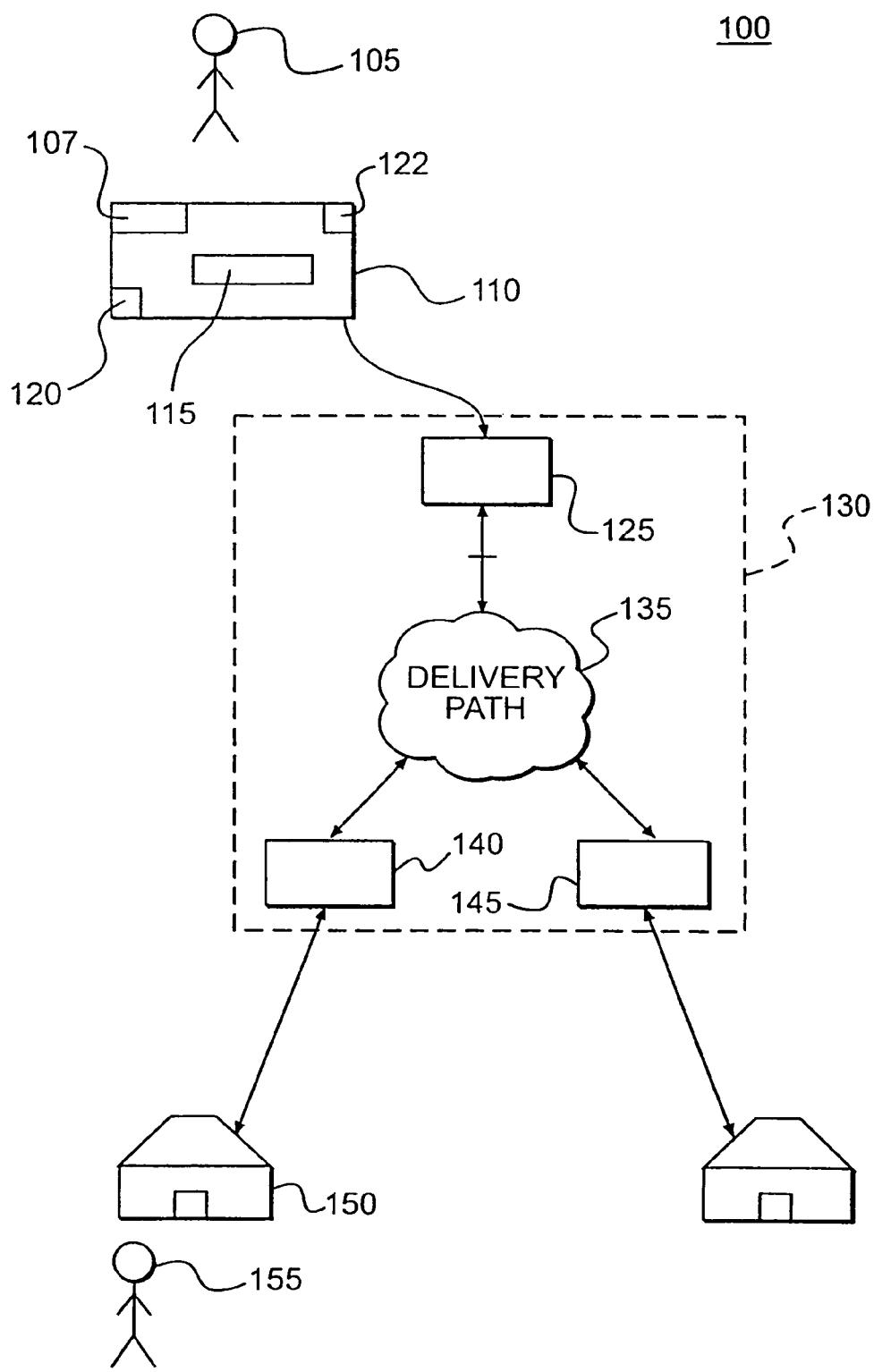
FIG. 1 is a functional block diagram of a system for providing item delivery service consistent with the present invention.

Reference will now be made to various embodiments consistent with this invention, examples of which are shown in the accompanying drawings and will be obvious from the description of the invention. In the drawings, the same reference numbers represent the same or similar elements in the different drawings whenever possible.

Exemplary Item Delivery System

FIG. 1 shows an exemplary item delivery system 100 that may be used in conjunction with the present invention. Within item delivery system 100, for example, an item 110 may be prepared manually by a user 105 or may be prepared utilizing an inserter under the supervision of user 105. An inserter is an automated device capable of assembling item 110 which may comprise a mailpiece, such as a United States Postal Service Priority Mail package, or a United States Postal Service Express Mail package. While item 110 may comprise any of the aforementioned, those skilled in the art will appreciate that still many other types of items may be utilized.

In exemplary item delivery system 100, materials are placed in item 110 that user 105 wishes to send to a recipient 155. With the materials placed in item 110, an address label 115 indicating a first address 150 of recipient 155 and a return address 107 indicating where to return item 110, if necessary, are placed on item 110. In addition, a tracking indicia 120 is placed on item 110 along with a delivery payment coding 122. Tracking indicia 120 is utilized by a delivery system operator to facilitate the delivery of item 110. The use of tracking indicia 120 will be discussed in greater detail below. Delivery payment coding 122 indicates the payment amount user 105 believes is required by the delivery system operator to deliver item 110 to recipient 155. Delivery payment coding 122 may comprise a bar code, an image indicating an account from which delivery payment has been made, a postage stamp, or other types of codings as are known by those skilled in the art.

Tracking indicia 120 may comprise a bar code, a PLANET code or other types of indicia as are known by those skilled in the art. A bar code is a printed symbol used for recognition by a bar code scanner (reader). Traditional one-dimensional bar codes use the bar's width to encode a product or account number. Two-dimensional bar codes, such as PDF417, MAXICODE and DATAMATRIX, are scanned horizontally and vertically and hold considerably more data. Generally, PDF417 is widely used for general purposes, MAXICODE is used for high-speed sorting, and DATAMATRIX is used for marking small parts.

Historically, some delivery system operators sorted flat mail using POSTNET, a 12-digit barcode developed by the USPS consisting of alternating long and short bars indicating the destination of, for example, a mailpiece. Responding to the expanding needs of users, particularly heavy volume users, PLANET code was developed on the foundation of the existing technical infrastructure. The PLANET Code is, in one respect, the opposite of the current POSTNET codes, reversing long bars for short and short bars for long. This innovation offers the convenience of a bar code that is easily applied using current bar-coding methods, and is readily scanned by the high-speed automation equipment already located in the plurality of plants comprising a delivery system 130 as discussed below.

In sending item 110, for example, user 105 places item 110 or a plurality of items into delivery system 130 at a sender plant 125. Item 110 is routed through delivery system 130 comprising sender plant 125, a delivery path 135, a first address plant 140, and a second address plant 145. Delivery path 135 comprises a plurality of plants similar to sender plant 125, first address plant 140, and second address plant 145. The plants within delivery system 130 contain, among other things, automated systems and sorting equipment and are designed to receive and process a plurality of items. Delivery system 130 is configured to sense tracking indicia 120 placed on item 110 as R passes through the elements of delivery system 130 directing the movement of item 110 through delivery system 130. Tracking indicia 120 sensed by delivery system 130 may comprise a bar code, a PLANET code, or other indicia as described herein above.

In the delivery process, item 110 is routed to the next most appropriate plant in delivery system 130. The appropriateness of the next plant in delivery system 130 depends upon the present location of the particular item in delivery system 130 and where item 110 is addressed. Ultimately, item 110 is routed in delivery system 135 to the plant that serves the delivery address indicated on item 110, according to established procedures. Thus item 110 is routed from plant to plant within delivery system 130 wherein item 110 efficiently converges on the plant that serves the delivery address indicated on the item, in this case, first address plant 140. Throughout this process, delivery system 130 tracks the progress of items 110 through delivery system 130.

Delivery Point Matching System

Figure 2:
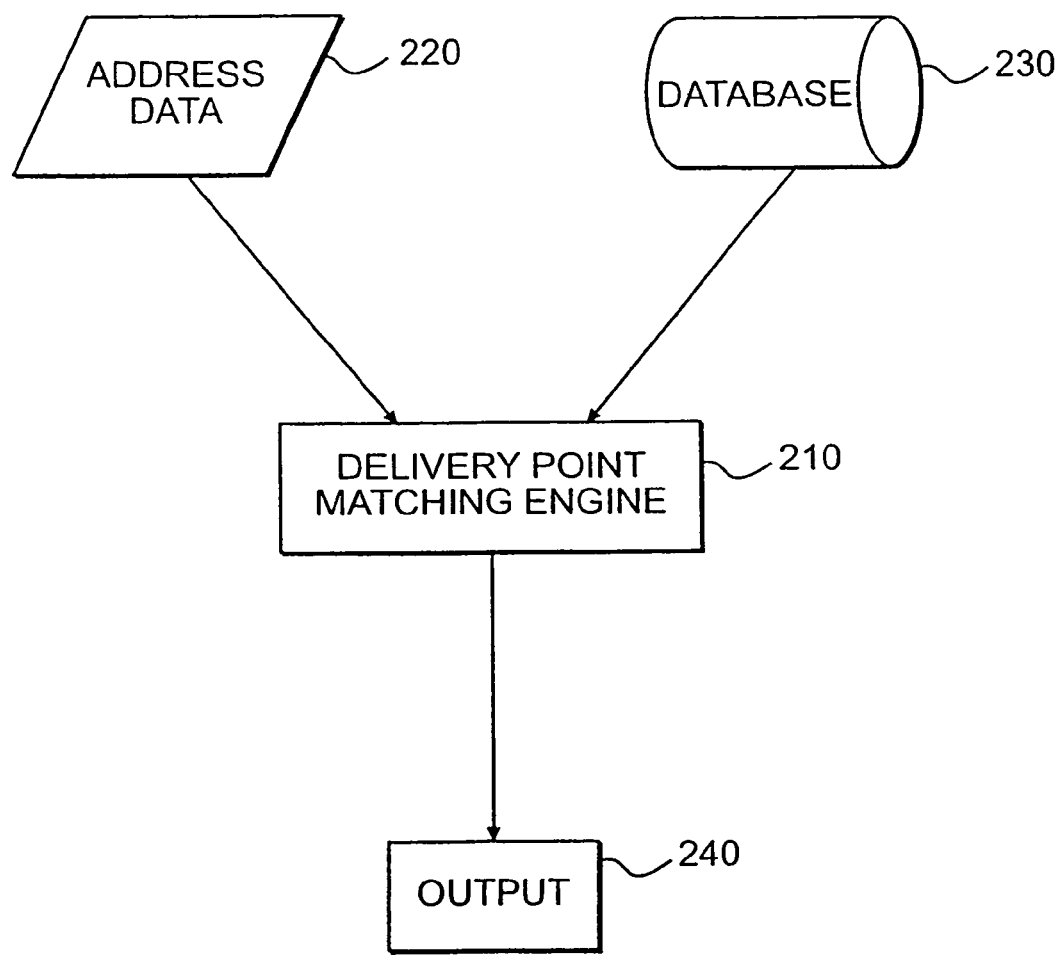
FIG. 2 is a functional block diagram of a system for providing address matching consistent with the present invention.

Consistent with the general principles of the present invention, an address matching system comprises a component for comparing an address against a plurality of address records in a database. In addition, the delivery point matching system includes a component for providing output data indicating whether the address has been matched to at least one of the plurality of address records in the data base. As herein embodied and illustrated in FIG. 2, an address matching system 200 comprises a delivery point matching engine 210, address data 220, a database 230, and output 240. In the exemplary embodiment of FIG. 2, the component for comparing an address against a plurality of address records in a database and the component for providing output data are both embodied in delivery point matching engine 210.

Delivery point matching engine 210 may comprise a personal computer or other similar microcomputer-based workstation. Those skilled in the art, however, will appreciate that delivery point matching engine 210 may comprise other types of computerized devices, such as hand-held devices, multi-processor systems, microprocessor-based or programmable consumer electronics, minicomputers, mainframe computers, and the like. Delivery point, matching engine 210 may also be practiced in distributed computing environments where tasks are performed by remote processing devices and may have the capability of connecting to a communications system. The communications system may comprise a wire line communications system, a wire line network, a wireless communications system, or a wireless network. "Wireless" can be defined as radio transmission via the airwaves, however, those skilled in the art will appreciate that various other communication techniques can be used to provide wireless transmission including infrared line of sight, cellular, microwave, satellite, packet radio, and spread spectrum radio. Delivery point matching engine 210 in the wireless environment can be any mobile terminal such as a smart phone, personal digital assistant (PDA), intelligent pager, portable computer, hand held computer, or any device capable of receiving wireless data. Wireless data may include, but is not limited to, paging, text messaging, e-mail, Internet access, and other specialized data applications specifically excluding voice transmission. A PDA is a handheld computer that serves as an organizer for personal information. It generally includes at least a name and address database, to-do list and note taker.

PDAs are typically pen-based and use a stylus ("pen") to tap selections on menus and to enter printed characters. The unit may also include a small on-screen keyboard which is tapped with the pen. Data may be synchronized between the PDA and a desktop computer through a cable or wireless transmissions.

Address data 220 may comprise any information relevant to the delivery of item 110 through delivery system 130 including data from address label 115, return address 107, tracking indicia 120, and delivery payment coding 122. Address data 220 may be in any format acceptable to delivery point matching engine 210. For example, address label 115 of item 110 may be scanned by an image capturing system (not shown) utilizing, for example, a video camera. The image capturing system may reside on a server separate from delivery point matching engine 210 that transmits address data 220 to delivery point matching engine 210 over a network. This network may comprise, for example, a local area network (LAN) or a wide area network (WAN). Such networking environments are commonplace in offices, enterprise-wide computer networks, intranets, and the Internet and are known by those skilled in the art. When a LAN is used as the network, the image capturing system and delivery point matching engine 210 may be connected to the network through a network interface located at each of the respective the image capturing system and delivery point matching engine 210. When a WAN networking environment is utilized as the network, the respective image capturing system and delivery point matching engine 210 may each typically include an internal or external modem or other means for establishing communications over the WAN, such as the Internet. While the aforementioned may be used to provide delivery point matching engine 210 with address data 220, those skilled in the art will appreciate that many other systems, subsystems and procedures may be employed.

Database 230 may comprise a delivery point database or an enhanced delivery point database. Both of these types of databases are discussed in more detail below with respect to FIG. 5 through FIG. 13. Database 230 may reside on the same server or system as delivery point matching engine 210 or may be remote from delivery point matching engine 210. If database 230 is remote from delivery point matching engine 210, the two may be connected by any of the types of networks or communications systems as discussed above. In addition, address matching system 200 may be operated by either the delivery system operator or delivery system user 105. In the case where address matching system 200 is operated by delivery system user 105, database 230 may be provided to delivery system user 105 by the delivery system operator.

Output 240 may comprise any computer-generated information displayed on screen, printed on paper or in machine readable form, such as disk and tape, transferred or transmitted from delivery point matching engine 210 to any peripheral device (not shown) or communications line (not shown).

Address Point Matching Method

Figure 3:
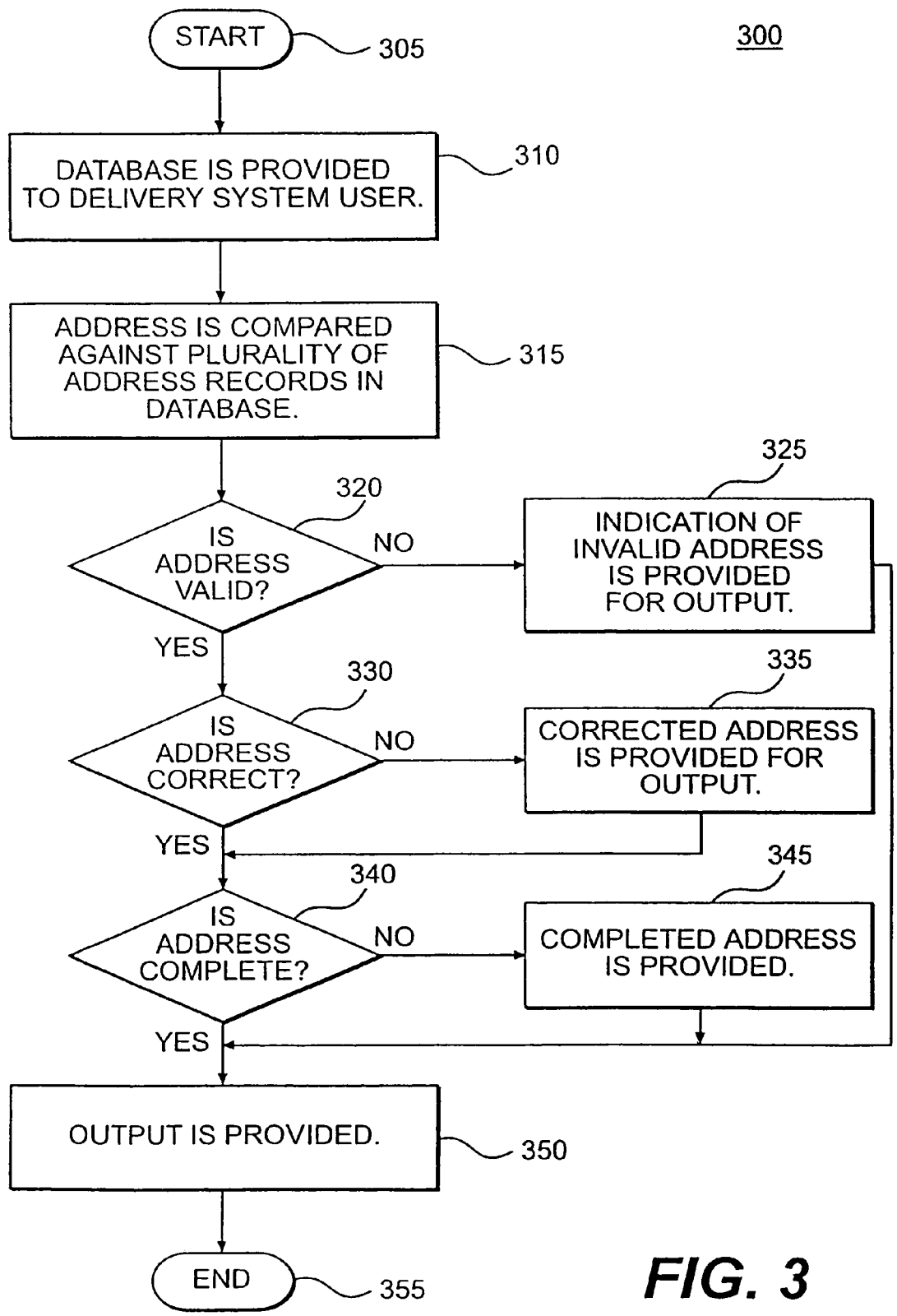
FIG. 3 is a flow chart of an exemplary method for providing address matching consistent with the present invention.

FIG. 3 is a flow chart setting forth the general stages involved in an exemplary address matching method 300. Exemplary method 300 begins at starting block 305 and proceeds to stage 310 where database 230 is provided to delivery system user 105. This stage is employed when address matching system 200 is operated by delivery system user 105. Those skilled in the art will appreciate that there are many ways to provide database 230 to delivery system user 105 including: transmission over an LAN, WAN (such as the Internet), attachment to an e-mail, or placing database 230 on a media such as a CD ROM or diskette and delivering the media to delivery system user 105.

From stage 310 where database 230 is provided to delivery system user 105, exemplary method 300 advances to stage 315 where address data 220 is compared against the plurality of address records in database 230. Database 230 may comprise a delivery point database or an enhanced delivery point database. Each of these types of databases is discussed in more detail below with respect to FIG. 5 through FIG. 13.

After address data 220 is compared against the plurality of address records in database 230 in stage 315, exemplary method 300 continues to decision block 320 where it is determined if address data 220 is valid. If at decision block 320 it is determined that the address data 220 is not valid, exemplary method 300 advances to stage 325 where an indication of an invalid address is provided for output.

Figure 4A:
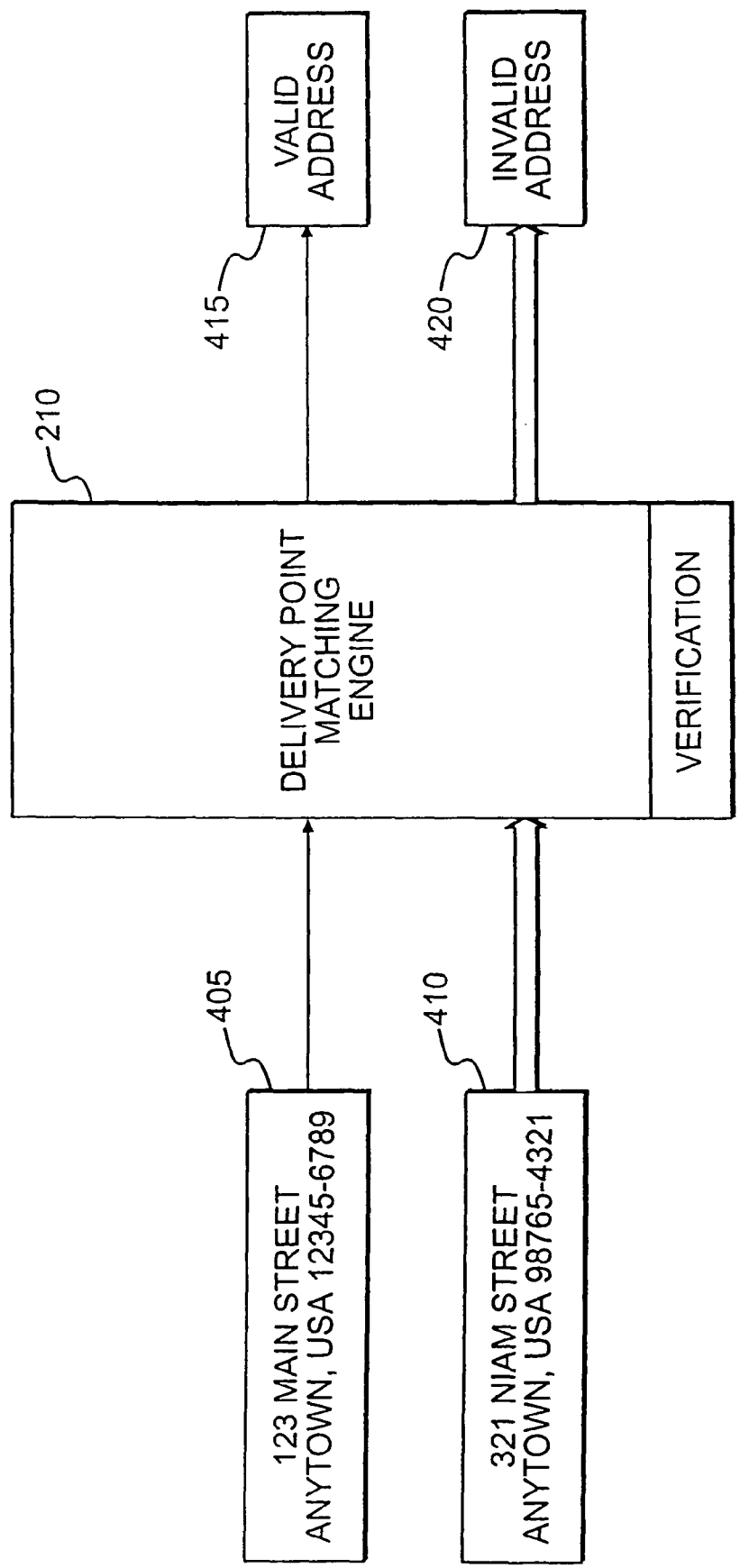
FIG. 4A is a functional block diagram of a system for providing address matching determining the validity of address data consistent with the present invention.

FIG. 4A shows an example of determining the validity of address data 220. A first address 405 and a second address 410 are presented to delivery point matching engine 210. First address 405 is 123 Main Street, Anytown, U.S.A., 12345-6789 presented to the delivery point matching engine 210. Delivery point matching engine 210 recognizes this as a valid address and reflects this in output 415. Delivery point matching engine 210 is also presented with second address 410 of 321 Niam Street, which is an example of a corrupted address. There is no such address anywhere in the United States that matches second address 410. Delivery point matching engine 210 determines that second address 410 is an invalid address and reflects this in output 420.

Referring back to FIG. 3, if at decision block 320, however, it was determined that address data 220 is valid, exemplary method 300 advances to decision block 330 where it is determined if address data 220 is correct. If at decision block 330 it is determined that the address data 220 is not correct, exemplary method 300 advances to stage 335 where a corrected address is provided for output.

Figure 4B:
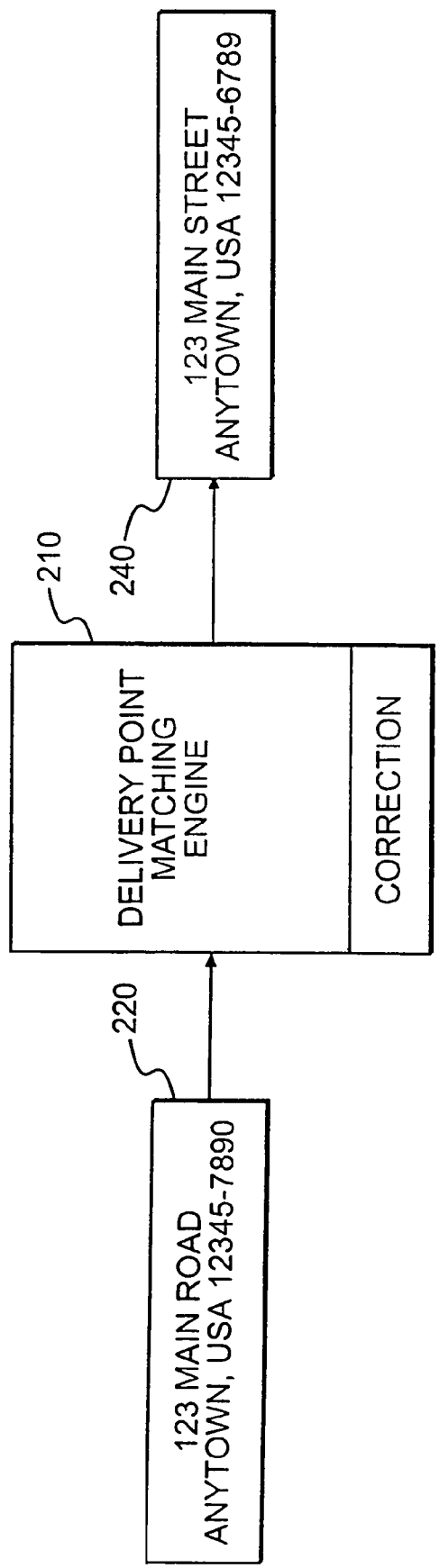
FIG. 4B is a functional block diagram of a system for providing address matching correcting an address consistent with the present invention.

FIG. 4B provides an example of delivery point matching engine 210 correcting an address. Address data 220, 123 Main Road, Anytown, U.S.A., ZIP Code 12345-6789, is presented to delivery point matching engine 210. Delivery point matching engine 210 provides a correction in this case because there is no 123 Main Road in this town, however, an exact match to 123 Main Street is found. Delivery point matching engine 210 provides the corrected address, 123 Main Street, Anytown, U.S.A., 12345-6789, as output 240.

If at decision block 330, however, it was determined that address data 220 is correct or from stage 335 where a corrected address is provided for output, exemplary method 300 advances to decision block 340 where it is determined if address data 220 is complete. If at decision block 340 it is determined that the address data 220 is not complete, exemplary method 300 advances to stage 345 where a completed address is provided for output.

Figure 4C:
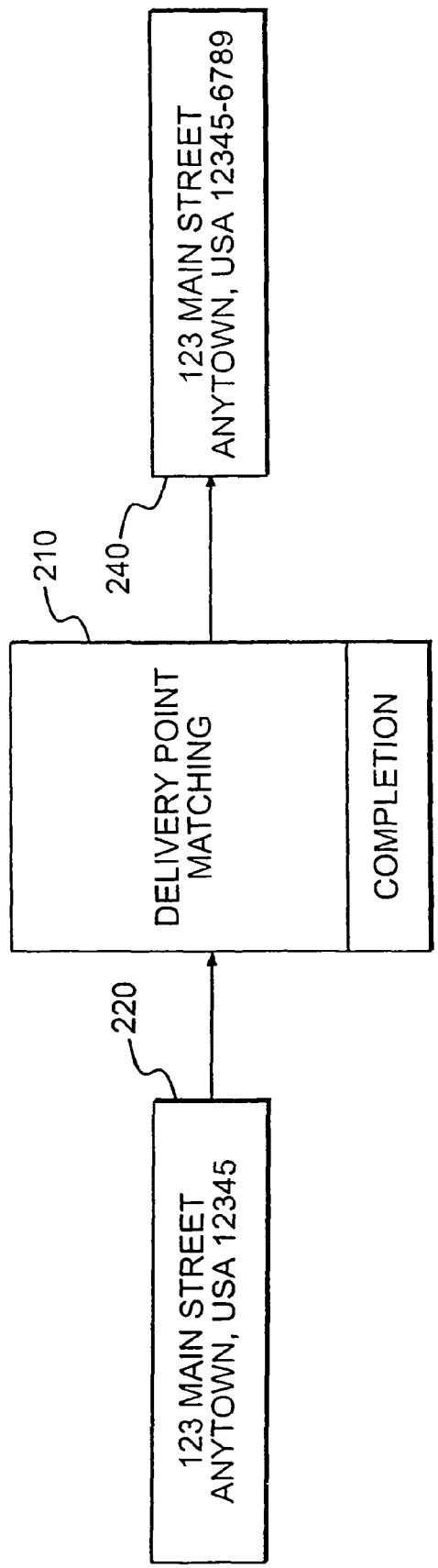
FIG. 4C is a functional block diagram of a system for providing address matching providing a completed address consistent with the present invention.

FIG. 4C provides an example of a completed address. The address data 220, 123 Main Street, Anytown, U.S.A., zip code 12345, is presented to the delivery point matching engine 210. The result is output 240, 123 Main Street, Anytown, U.S.A., zip 12345-6789, which now contains the full Zip+4 code. The add-on of 6789 to the zip code is now a complete address.

If at decision block 340, however, it was determined that address data 220 is complete, or from stage 345 where a completed address is provided for output, or from stage 325 where an indication of an invalid address is provided for output, exemplary method 300 continues to stage 350 where output 240 is provided.

Once output 240 is provided in stage 350, exemplary method 300 ends at stage 355.

Databases

Figure 7:
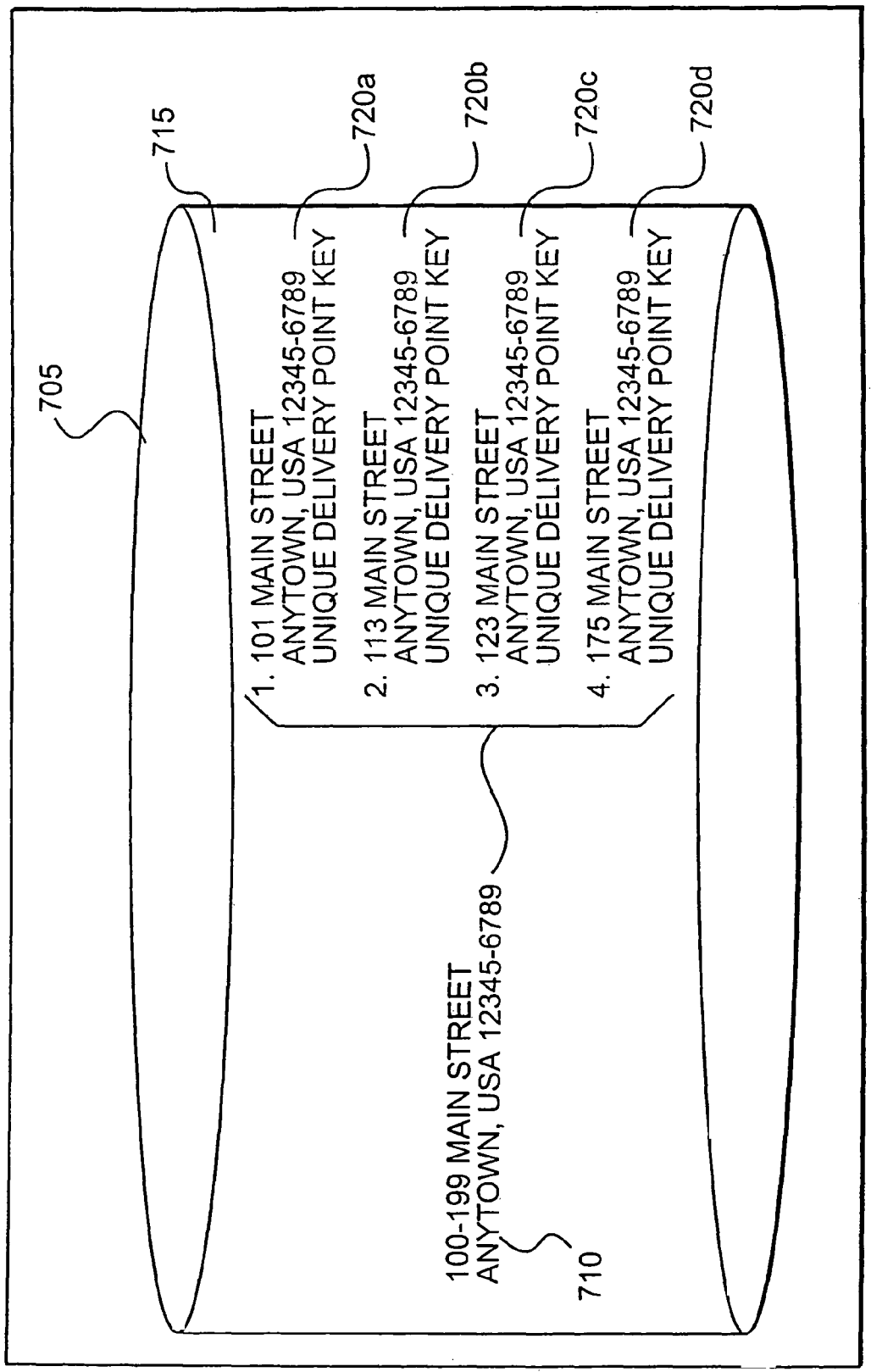
FIG. 7 is a functional block diagram illustrating an enhanced delivery point database consistent with the present invention.

As discussed above, database 230 may comprise two different types, a delivery point database 505 (FIG. 5) and an enhanced delivery point database 705 (FIG. 7). Certain difference and similarities between delivery point database 505 and enhanced delivery point database 705 will be discussed with respect to FIG. 5 through FIG. 13.

Figure 5:
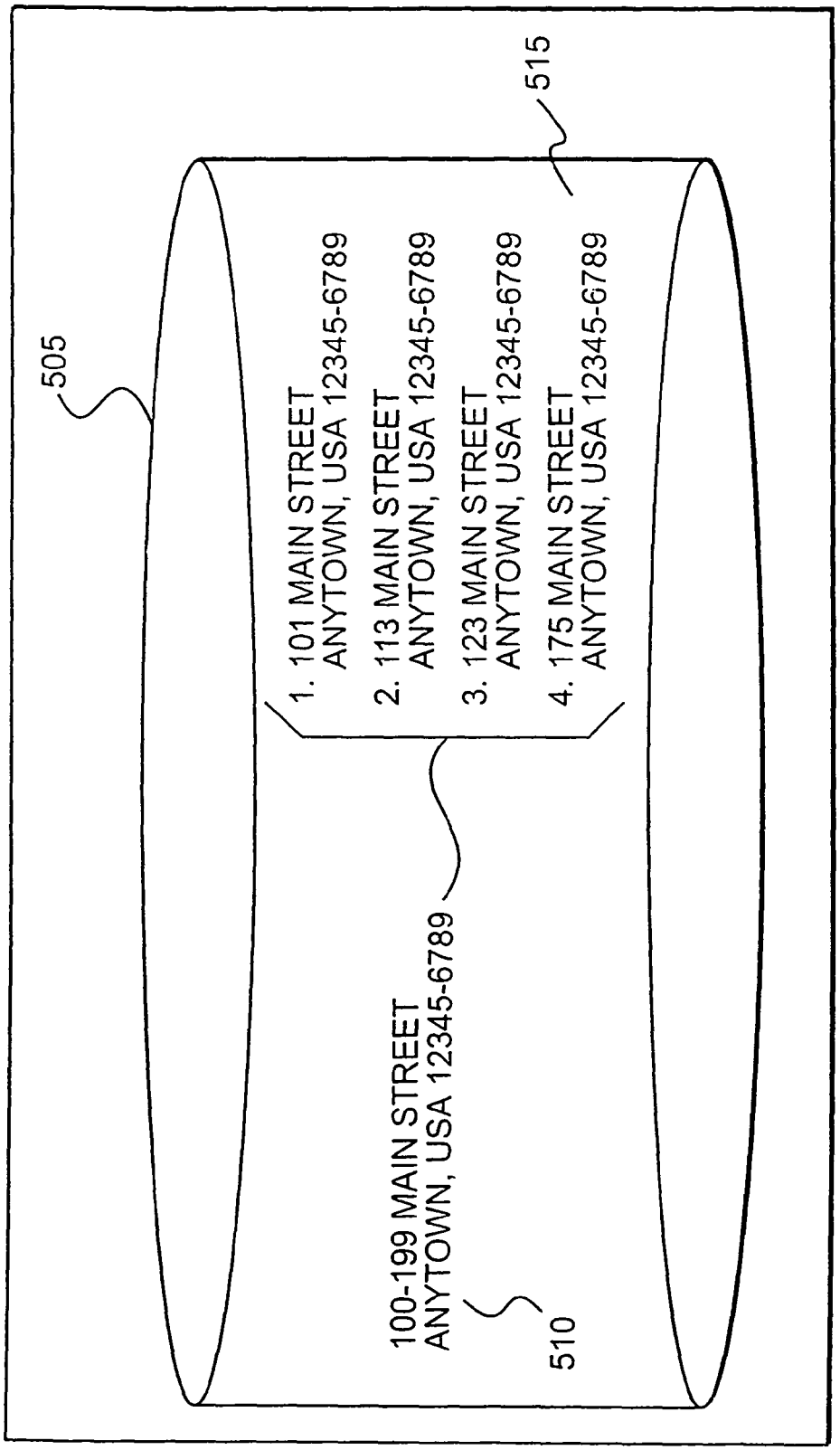
FIG. 5 is a functional block diagram illustrating an exemplary delivery point database consistent with the present invention.

FIG. 5 shows an example of delivery point database 505. Delivery point database 505 contains all the valid addresses within item delivery system 100 in correct and complete form. The delivery system operator may be prohibited, by law for example, from providing address lists. In this case, for example, a geographical segment code from an address in question, such as the geographical segment code utilized in the USPS ZIP+4 codes, may be utilized to determine if the address in question exists within the geographical segment, and if so, can then be validated, completed, or corrected.

For example, the address in question may contain a geographical segment code 12345-6789 corresponding to an address range 510 (100 through 199 Main Street, Anytown, U.S.A., zip code 12345-6789) as shown in FIG. 5. From address range 510, all valid addresses 515 in delivery point database 505 corresponding to address range 510 can be checked against the address in question. From this, the address in question can be validated, completed, or corrected as needed. This is an improvement over past systems at least because past systems merely returned a range of addresses within a given geographical segment and did not verify whether the delivery point existed or not. FIG. 6 shows is an exemplary record 605 of delivery point database 505. This exemplary record consists of the 32 elements.

FIG. 7 shows an example of enhanced delivery point database 705. Enhanced delivery point database 705 contains all the valid addresses of the item delivery system 100 in correct and complete form similar to delivery point database 505 of FIG. 5. In addition, each address record of enhanced delivery point database 705 contains unique delivery point identification keys 720a-720d.

FIG. 8 shows an exemplary record 805 of delivery point database 705. This exemplary record consists of the same 32 elements as shown with respect to FIG. 6 as described above. Included in the exemplary record 805, in addition to the elements of exemplary record 605, is a delivery point key element 810. The significants of delivery point key element 810 will be discussed below with respect to FIG. 9 through FIG. 13.

Referring back to FIG. 7, for example, similar to delivery point database 705, the address in question may contain a geographical segment code 12345-6789 corresponding to an address range 710 (100 through 199 Main Street, Anytown, U.S.A., zip code 12345-6789) as shown if FIG. 7. From address range 710, all valid addresses 715 in delivery point database 705 corresponding to address range 710 can be checked against the address in question. From this, the address in question can be validated, completed, or corrected as needed. In contrast to delivery point database 505, however, address records of delivery point database 705 additionally contain unique delivery point identification keys 720a-720d.

Figure 9:
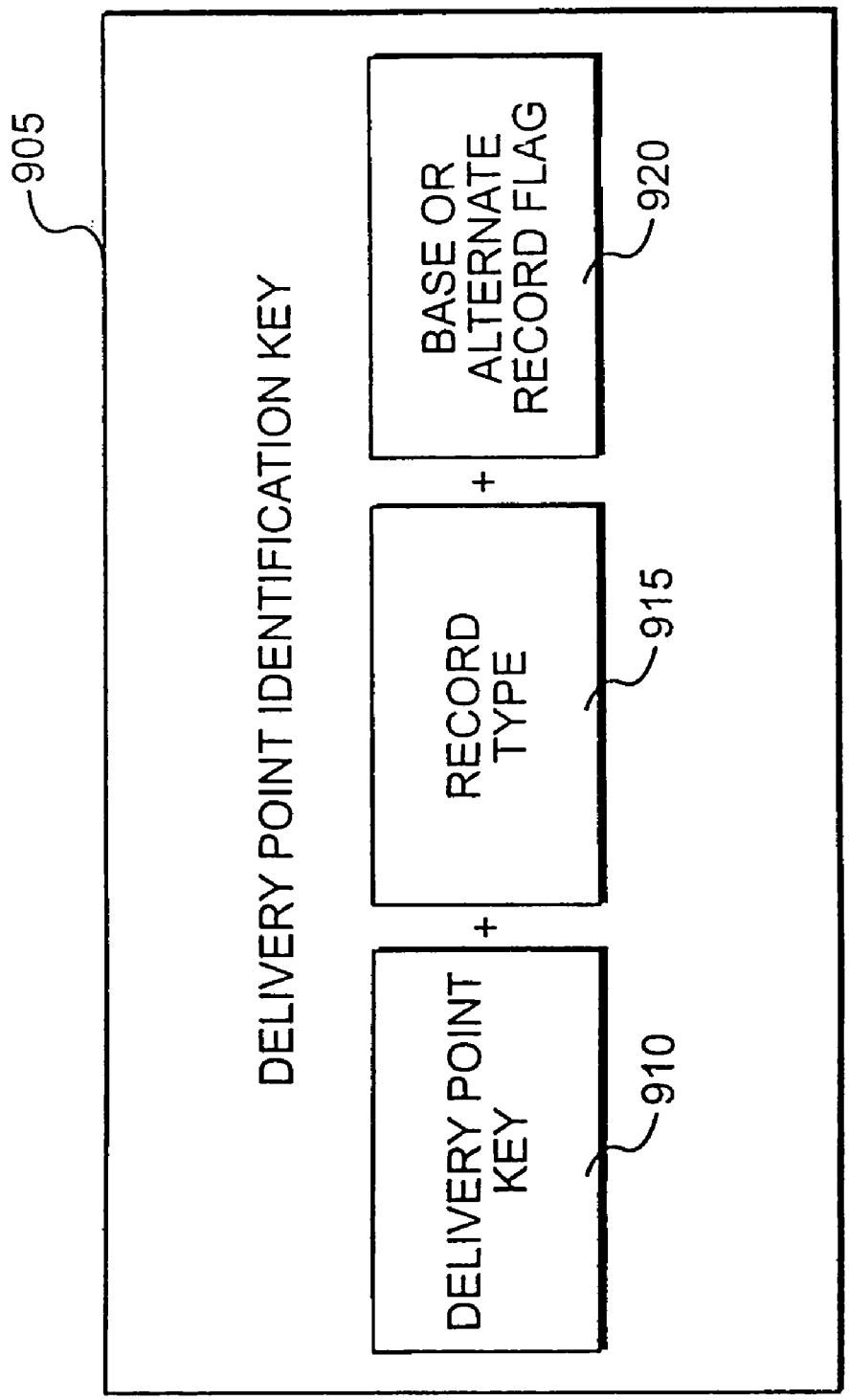
FIG. 9 is a functional block diagram illustrating the composition of a typical delivery point identification key consistent with the present invention.

FIG. 9 shows an example of the composition of a typical delivery point identification key 905. Delivery point identification key 905 may comprise three elements: a delivery point key 910, a record type 915, and a record flag 920, which may comprise a base record flag or a alternate record flag. Each of the elements of delivery point identification key 905 are described in detail with respect to FIG. 10 through FIG. 12.

FIG. 10 shows an exemplary delivery point key 910 having a value of 1999-07-10-12.06.33.223318. As described in legend 1010, starting from the left of delivery point key 910, the first four characters are the year of creation, followed by a dash, followed then by the month of creation (two characters), followed again by a dash, followed by the day of creation (two characters), followed by a dash, followed by the hour of creation. This is then followed by two characters for the minute of creation followed by a dot or period, followed by two characters for the second of creation followed by a dot, and then followed by a six character sequence number for records created within that same second.

Figure 11:
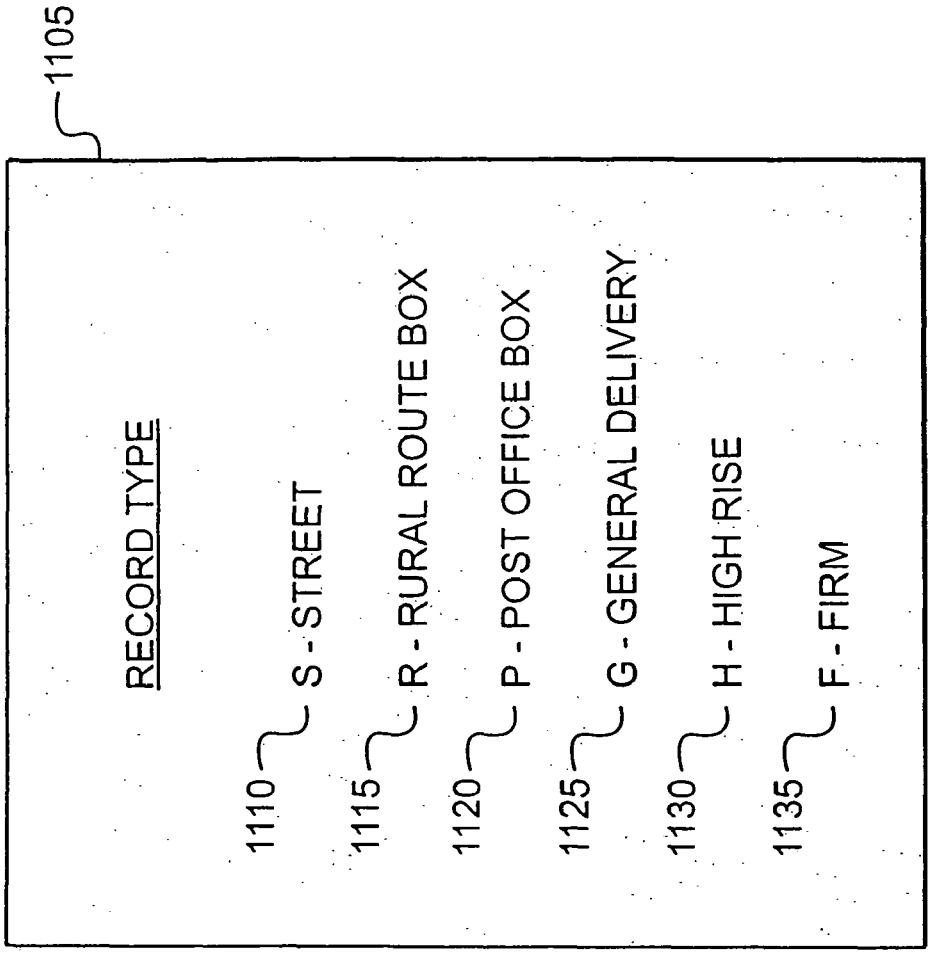
FIG. 11 is a functional block diagram illustrating exemplary record types consistent with the present invention.

FIG. 11 shows exemplary record types 1105 that may comprise record type 915. The exemplary record types 1105 are as follows: S 1110 is for street records. This record type is for addresses that follow the characteristic 123 Main Street type addressing. R 1115 is for rural route boxes, for example Rural Route 1, Box 12. Next, P 1120 is for Post Office Box, for example, Post Office Box 7502. G 1125 is for general delivery. General delivery is a service provided by the USPS under certain conditions for people that either cannot or do not want to or do not need to rent a post office box or have other means of addressing. They can have mail sent to them addressed as, for instance, John Doe, General Delivery, Memphis, Tenn., 38101. An item addressed as such would go to a specific place within the city of Memphis where the addressee can pick the mail up periodically.

Next in the list of exemplary record types 1105, is H 1130 for high rise. High rise is used to identify multiple deliveries with the same primary address. For instance, if there are 17 addresses at one address, for example, 101 Main Street, they would be identified as high rise delivery points within that address, apartment 1, apartment 2, apartment 3, and so forth. This is to differentiate those addresses from the street type address S 110 within that same geographical segment. Finally, F 1135 is for a firm record. Firm record type identifies businesses that receive extremely high volumes of mail so that they can be assigned a separate geographical segment such as a ZIP+4 code.

FIG. 12 illustrates the use of base record flag and alternate record flag. Generally, record flag 920 is "base" if the address record describes or represents the primary or best known address for a particular delivery point. In most cases, there is one and only one address record for any given delivery point. As shown in FIG. 12, address record 1205 is base, having 123 Main Street, Anytown, USA 12345-6789 as the one and only address record for the given delivery point. There are cases, however, where there are alternates to an address for a given delivery point. In the example of FIG. 12, the delivery point file is alternate, for example, if the address known as 123 Main Street, Anytown, USA 12345-6789 also has 123 Garner Street, Anytown, USA 123456789 as an alternate address record 1210. The alternate address record exists only as a subordinate to the base address record and may be precipitated by the changing of a street name. For example, Main Street may have once been know as Garner Street.

Figure 13:
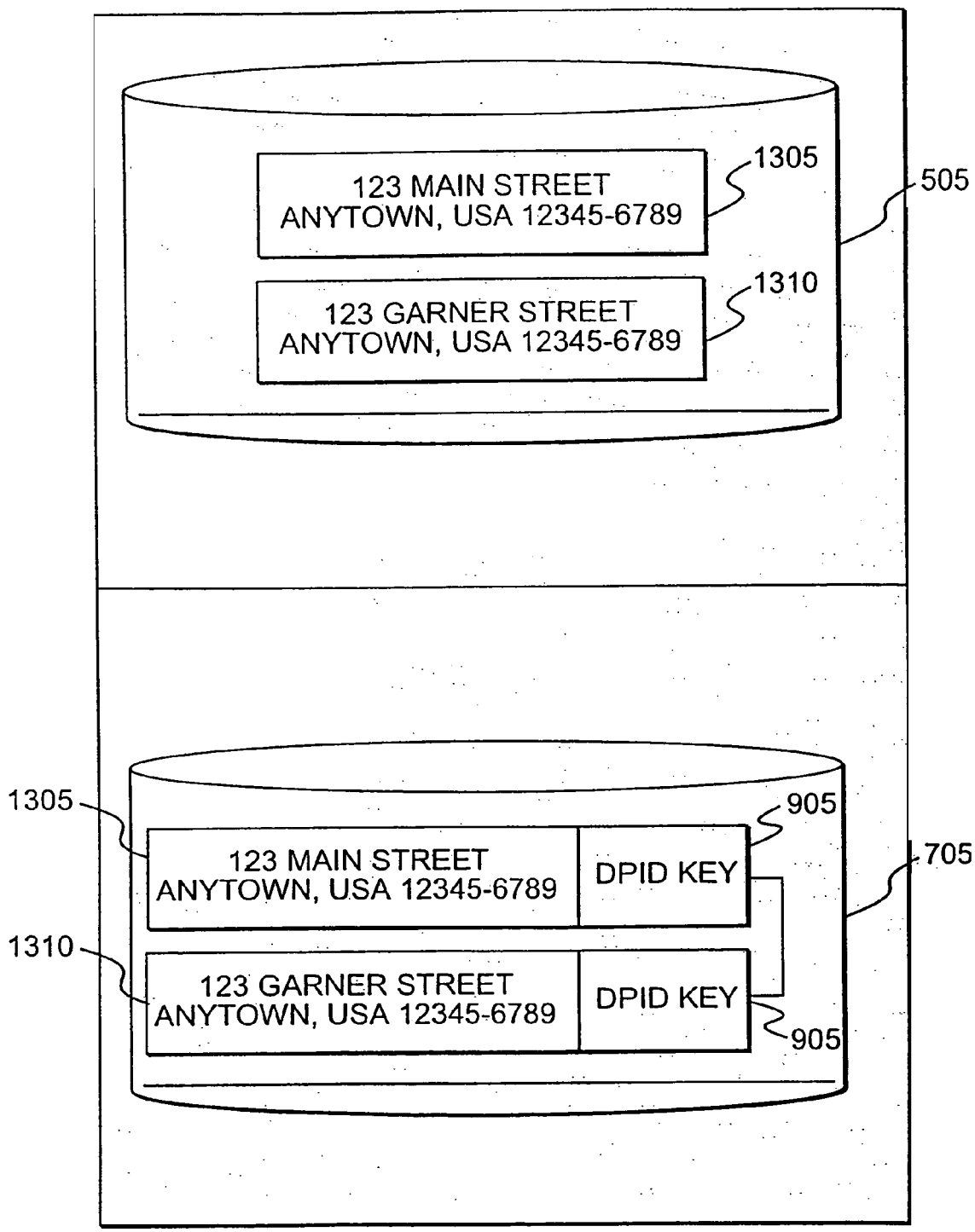
FIG. 13 is a functional block diagram illustrating the advantages of the delivery point identification key of an enhanced delivery point database consistent with the present invention.

FIG. 13 illustrates the advantages of the delivery point identification key of enhanced delivery point database 705 over delivery point database 505. Before the introduction of the delivery point identification key, in delivery point database 505, if an address was changed, for example from 123 Main Street, Anytown, USA 12345-6789 to 123 Garner Street, Anytown, USA 12345-6789, no direct link was provided between an old address 1305 and a new address 1310. So under delivery point database 505, it is difficult for delivery system user 105 to actually track recipient 155 and ensure, for example, the same customer is being served based on the information that was contained in delivery point database 505. It was also difficult for the delivery system operator to keep track of the same information. With delivery point identification key 905 of enhanced delivery point database 705, however, if the address is changed, for example, from 123 Main Street to 123 Gamer Street in Anytown, USA, the changes can be tracked. This is because the previous address record and the new address record associated with the same delivery point both have the same delivery point identification key 905. This provides the opportunity for delivery system user 105 or the delivery system operator to understand that physically the two addresses are associated with the same delivery point, even though the addresses are different.

One benefit of enhanced delivery point database 705 is that delivery system users can track their customers in those cases where the addresses were changed. These address changes can come about, for example, in rural routes where the rural route box numbers are changed, in the cases of a post office box where the post office box numbers are changed, or when the Post Office changes a customer's zip code.

In view of the foregoing, it will be appreciated that the present invention provides a system and method for matching an address. Still, it should be understood that the foregoing relates only to the exemplary embodiments of the present invention, and that numerous changes may be made thereto without departing from the spirit and scope of the invention as defined by the following claims.

We claim:

1. A method for matching delivery point addresses, comprising:
    providing a delivery point database of addresses of delivery points in an item delivery system, the delivery point database including:
        a base address record including a base address of a specific delivery point in the item delivery system and a delivery point identification key corresponding to the specific delivery point, and
        an alternate address record including an alternate address of the specific delivery point and the delivery point identification key corresponding to the specific delivery point,
            wherein the delivery point identification key comprises a delivery point key and a record type, and
            the delivery point key comprises data derived independently from the alternate address and the base address;
    receiving an item for delivery to the specific delivery point, the item including only the alternate address of the specific delivery point;
    locating the alternate address record in the delivery point database based on the alternate address included on the item;
    using the delivery point identification key from the alternate address record to locate the base address record in the delivery point database; and
    outputting the base address of the specific delivery point for use in delivery of the item to the specific delivery point.

2. The method of claim 1, wherein a specific delivery point is a physical delivery location served by the item delivery system.

3. The method of claim 1, wherein the base address is a current address of the specific delivery point and the alternate address is a previous address of the specific delivery point.

4. The method of claim 1, wherein the alternate address is replaced by the base address due to one of: a street name change, a change in a street numbering scheme, a change in rural route box numbers, a change in post office box numbers, and a change in a ZIP code of the specific delivery point.

5. The method of claim 1, wherein the record type indicates that the base address is one of a street address, a rural route box address, a post office box address, a general delivery address, a high rise address, and a firm address.

6. The method of claim 1, further comprising:
    providing the delivery point database to an item delivery system user.

7. A method for matching delivery point addresses, comprising:
    providing a delivery point database of addresses of delivery points in an item delivery system, the delivery point database including:
        a base address record including a base address of a specific delivery point in the item delivery system and a delivery point identification key corresponding to the specific delivery point, and
        an alternate address record including an alternate address of the specific delivery point and the delivery point identification key corresponding to the specific delivery point,
            wherein the delivery point identification key includes a delivery point key, a record type, and an alternate flag indicating that the specific delivery point has both a base address and an alternate address, and
            the delivery point key comprises data derived independently from the alternate address and the base address;
    receiving an item for delivery to the specific delivery point, the item including only the alternate address of the specific delivery point;
    locating the alternate address record in the delivery point database based on the alternate address included on the item;
    using the delivery point identification key, including the alternate flag, from the alternate address record to locate the base address record in the delivery point database; and
    outputting the base address of the specific delivery point for delivery of the item to the specific delivery point.

8. The method of claim 7, wherein the specific delivery points are physical delivery locations served by the item delivery system.

9. The method of claim 7, wherein the base address is a current address of the specific delivery point and the alternate address is a previous address of the specific delivery point.

10. The method of claim 7, wherein the alternate address is replaced by the base address due to one of: a street name change, a change in a street numbering scheme, a change in rural route box numbers, a change in post office box numbers, and a change in a ZIP code of the specific delivery point.

11. The method of claim 7, wherein the record type indicates that the base address is one of a street address, a rural route box address, a post office box address, a general delivery address, a high rise address, and a firm address.

12. The method of claim 7, further comprising:
    providing the delivery point database to an item delivery system user.

13. A computer system for matching delivery point addresses, comprising:
    a delivery point database including:
        a base address record including a base address of a specific delivery point in an item delivery system and a delivery point identification key corresponding to the specific delivery point, and an alternate address record including an alternate address of the specific delivery point and the delivery point identification key corresponding to the specific delivery point, wherein the delivery point identification key includes a delivery point key, a record type, and an alternate flag indicating that the specific delivery point has both a base address and an alternate address, and the delivery point key comprises data derived independently from the alternate address and the base address; and a processor communicatively coupled to the delivery point database configured to:

receive data about an item for delivery to the specific delivery point, the data about the item including only the alternate address of the specific delivery point;

locate the alternate address record in the delivery point database based on the alternate address included with the item;

use the delivery point identification key, including the alternate flag, from the alternate address record to locate the base address record in the delivery point database; and output the base address of the specific delivery point for delivery of the item to the specific delivery point.

14. The system of claim 13, wherein the specific delivery points are physical delivery locations served by the item delivery system.

15. The system of claim 13, wherein the base address is a current address of the specific delivery point and the alternate address is a previous address of the specific delivery point.

16. The system of claim 13, wherein the alternate address is replaced by the base address due to one of: a street name change, a change in a street numbering scheme, a change in rural route box numbers, a change in post office box numbers, and a change in a ZIP code of the specific delivery point.

17. The system of claim 13, wherein the record type indicates that the base address is one of a street address, a rural route box address, a post office box address, a general delivery address, a high rise address, and a firm address.

* * * * *

UNITED STATES PATENT AND TRADEMARK OFFICE
CERTIFICATE OF CORRECTION

| | | |
|---|---|---|
| PATENT NO. | : 8,140,551 B2 | Page 1 of 1 |
| APPLICATION NO. | : 12/222903 | |
| DATED | : March 20, 2012 | |
| INVENTOR(S) | : Michael C. Garner et al. | |

It is certified that error appears in the above-identified patent and that said Letters Patent is hereby corrected as shown below:

Title Page, Item 57 (Abstract), line 4, "one or the following" should read --one of the following--.

Signed and Sealed this
Fifteenth Day of May, 2012

David J. Kappos
*Director of the United States Patent and Trademark Office*